May 10, 1966 K. SCHWADERLAPP 3,250,504
CHRISTMAS TREE STAND
Filed July 1, 1964 3 Sheets-Sheet 1
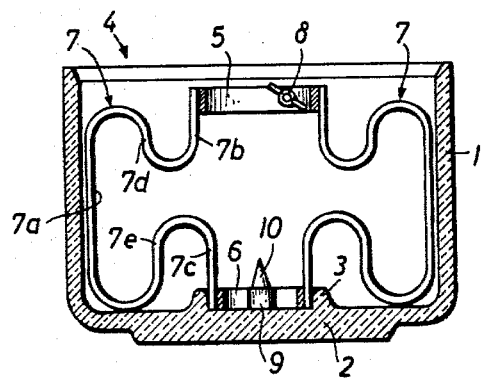
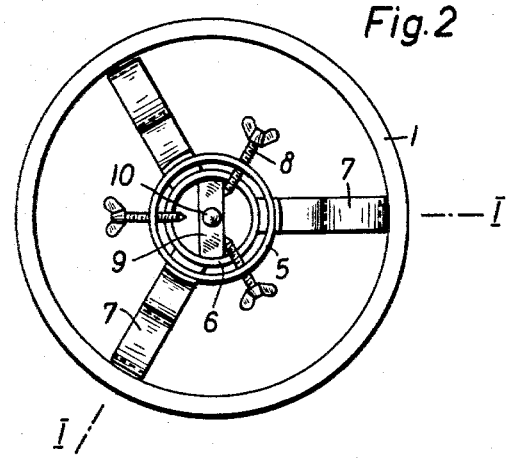
INVENTOR
KURT SCHWADERLAPP
BY
*Lowry & Rinehart*
ATTYS.

May 10, 1966  K. SCHWADERLAPP  3,250,504
CHRISTMAS TREE STAND

Filed July 1, 1964  3 Sheets-Sheet 2

INVENTOR
KURT SCHWADERLAPP
BY
Lowry & Rinehart
ATTYS.

May 10, 1966 K. SCHWADERLAPP 3,250,504
CHRISTMAS TREE STAND

Filed July 1, 1964 3 Sheets-Sheet 3

INVENTOR
KURT SCHWADERLAPP
BY
Lowry & Rinehart
ATTYS.

United States Patent Office 3,250,504
Patented May 10, 1966

3,250,504
CHRISTMAS TREE STAND
Kurt Schwaderlapp, Waldweg, Baumbach, Westerwald, Germany, assignor to Jasba-Keramikfabriken Jakob Schwaderlapp & Sohne, Baumbach, Westerwald, Germany
Filed July 1, 1964, Ser. No. 379,621
Claims priority, application Germany, July 3, 1963, J 11,767
9 Claims. (Cl. 248—44)

This invention relates to a novel stand for supporting elongated elements in a generally vertical plane, and in particular, to a novel Christmas tree stand including a container for keeping a supply of water for a tree inserted therein, and a retaining device for supporting the tree by bearing engagement between the same and a body wall of the container.

It is known to provide tree stands which include a water container or the like, and a retaining device into which an end of a tree is inserted and clamped. Such tree stands also may include a lower plate about which are arranged a plurality of upwardly projecting rods which press against a wall of a spreadable member surrounding the tree upwardly from its lower end to support the tree in the container. Devices of this type are generally both awkward to manipulate and fail to securely support a tree inserted therein.

In accordance with this invention it is a primary object to provide a novel tree stand including a retaining device for receiving the bottom end portion of a tree or tree trunk, the retaining device including upper and lower circular guide members for rings securely joined together by connecting rods, and the connecting rods being inwardly or outwardly curved and of a resilient construction for bearing against the lower tree ends and/or a body wall of a container in which the retaining device is positioned for supporting the tree vertically and maintaining the same substantially centered with respect to the container.

A further object of this invention is to provide a novel tree stand of the type referred to above in which the connecting rods include undulating portions for bearing against a major portion of the container body wall, and further including telescoping arms connected between the guide rings and the body wall; the arrangement thus providing firm support for the tree, automatically centering thereof, a constant water supply, and ease of insertion of the tree into and the withdrawal of the tree from the tree stand.

Still another object of this invention is the provision of a novel tree stand of the type above described in which the container is constructed of ceramic material to insure the abutment of the connecting rods thereagainst, and the connecting rods having padded end portions bearing against the container body wall to prevent slippage of the retaining device and marring of the container.

A further object of this invention is to provide a novel tree stand of the type referred to above in which the retaining device is further provided with a generally downwardly opening U-shaped ring which receives an upper rim of the container body wall, and through which are radially adjustably guided a plurality of clamping screws for fastening the lower tree end in the retaining device, or alternatively, the screws are passed directly through the container body wall.

These objects are accomplished by means of structure and relative arrangement of parts as will fully appear in the following description and the accompanying drawings, in which:

FIGURE 1 is an axial sectional view of a novel tree stand constructed in accordance with this invention taken along line I—I of FIGURE 2, and illustrates a retaining device centered in a container of the tree stand.

FIGURE 2 is a top plan view of the tree stand of FIGURE 1, and more clearly illustrates guide rings and connecting rods of the retaining device.

Figure 3:
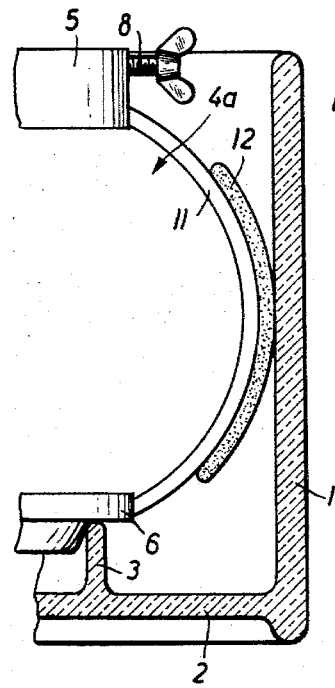
FIGURES 3 and 4 are fragmentary axial sectional views of two further embodiments of the invention, illustrating variations in the connecting rods of the tree stand of FIGURES 1 and 2.

A novel Christmas stand constructed in accordance with this invention is best illustrated in FIGURES 1 and 2 of the drawings, and comprises a water container 1 which includes a cylindrical body wall (unnumbered) terminating at a lowermost end portion in a bottom wall 2. The bottom wall 2 includes a centering device 3 which is in the form of an upwardly projecting annular rib.

A retaining device 4 for clampingly securing a lower end portion of a tree in the container 1 is housed in the container 1. The retaining device 4 includes an upper guide ring 5 in axial alignment with a lower guide ring 6 which is seated in the area defined by the annular rib 3. Both of the guide rings 5 and 6 are substantially circular (FIGURE 2), and are joined together by a plurality of metallic spring connecting rods 7 which are inherently resilient, there being three such connecting rods 7 shown in FIGURE 2 of the drawings, but more or less than this number may be provided in equal circumferentially spaced relationship to the rings 5 and 6.

The resilience of each of the spring connecting rods 7 can be increased by the particular undulating configuration of the rods 7 as is best illustrated of FIGURE 1 of the drawings. With particular reference to FIGURE 1, each of the connecting rods 7 includes an upper axial portion 7b and a lower axial portion 7c respectively connected to the guide rings 5 and 6 in a conventional manner, as by welding. A radially outwardmost portion 7a of each connecting rod 7 is spaced from and generally parallel to the portions 7b and 7c, but the portion 7a is preferably bowed or curved radially outwardly so that upon the insertion of the retaining device 4 into the container 1 the portion 7a straightens into parallelism with the portions 7b and 7c. Generally sinusoidal or undulating portions 7d and 7e are integrally joined between the respective portions 7b and 7c and the portion 7a. These undulating portions 7d and 7e urge the portions 7a of each of the connecting rods 7 radially outwardly into intimate bearing engagement with the body wall (unnumbered) of the container 1 to securely clamp the retaining device 4 centrally in the container.

A plurality of adjustable wing bolts or screws 8 are radially received in openings (unnumbered) in the upper circular guide ring 5 for clamping engagement with the end portion of a tree inserted into the retaining device 4. A cross member 9 having an upwardly directed spike 10 is positioned in the area defined by the lower circular guide ring 6 for penetrating into an end of a lower end portion of the tree positioned in the retaining device 4 in a conventional manner.

Another retaining device 4a is illustrated in FIGURE 3 of the drawings, and comprises circular guide rings 5 and 6, and wing bolts 8 corresponding to the identically numbered elements of the retaining device 4 of FIGURES 1 and 2. The retaining device 4a further includes a plurality of metallic ring connecting rods 11 which are radially outwardly bowed or curved and equally circumferentially spaced about and connected to the guide rings 5 and 6. These rods 11 automatically center the retaining device 4a in the container 1, in the manner heretofore described in the consideration of the tree stand shown in FIGURES 1 and 2 of the drawings.

In order that the connecting rods 11 will not damage the container 1 or slip relative to the same, the rods are provided on outermost surfaces thereof with a padding 12 of, for example, soft foam plastic material, which bears against the container 1, which is preferably constructed of ceramic material or the like.

Figure 4:
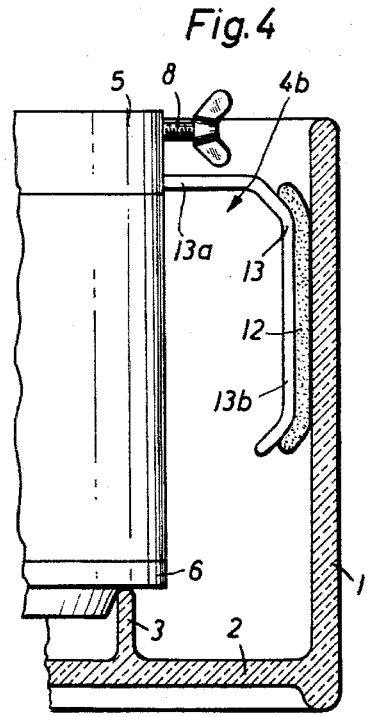

A tree stand shown in FIGURE 4 of the drawings is substantially identical to the tree stand illustrated in FIGURE 3, i.e., rings 5, 6 are connected by a tubular sleeve (unnumbered) except that a retaining device 4b is provided with a plurality of metallic spring centering rods 13 having radially outwardly directed portions 13a and axially downwardly directed portions 13b. With this arrangement the centering rods 13 similarly bear against the container 1 to centrally secure the retaining device 4b therein. While the centering rods 13 are illustrated as being secured to the upper guide ring 5, identical centering rods (not shown) can be secured to the lower guide ring 6 with the end portions (unnumbered) corresponding to the end portions 13b being directed upwardly. If desired such centering rods directed upwardly may be alternately arranged with respect to the centering rods 13 projecting downwardly.

Figure 5:
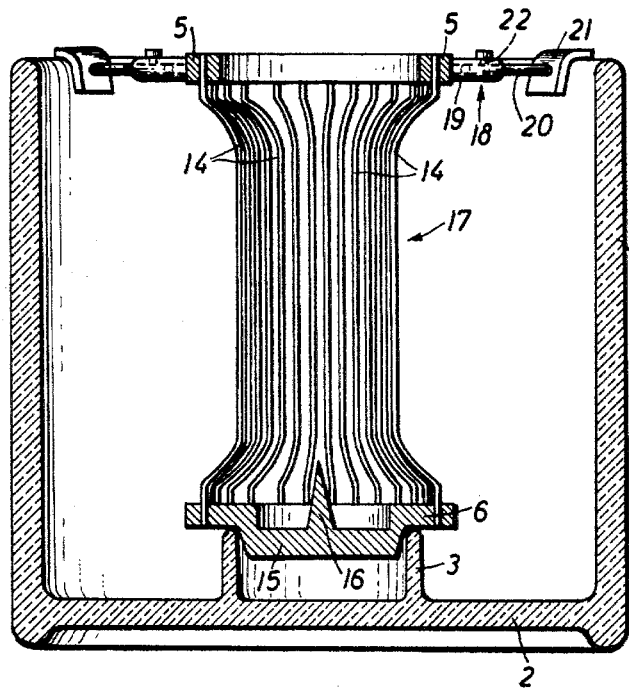
FIGURE 5 is an axial sectional view of another tree stand constructed in accordance with this invention, and illustrates radially extending telecopic arms secured between an upper guide ring of the retaining device and an upper rim of the container body wall.
Figure 6:
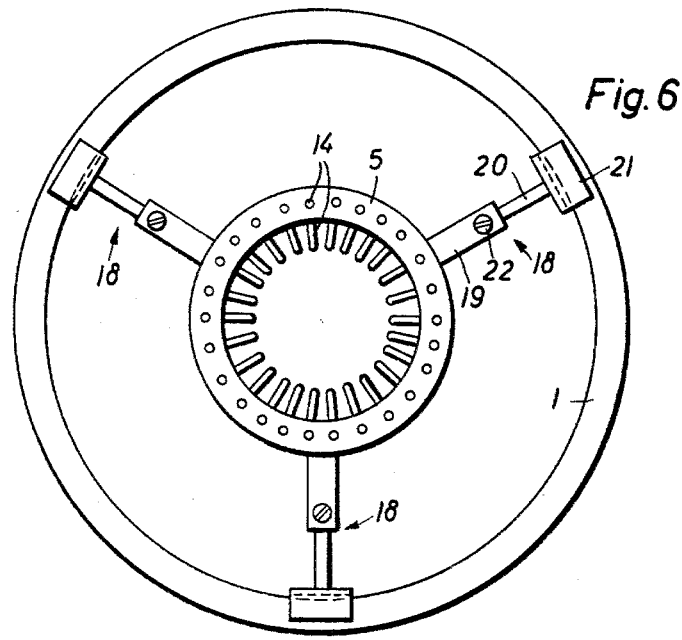
FIGURE 6 is a top plan view of the tree stand of FIGURE 5, and more clearly illustrates the various components thereof.

In the tree stand illustrated in FIGURES 5 and 6 of the drawings a plurality of metallic resilient connecting rods 14 are radially inwardly bowed or curved so that a lowermost end portion inserted between these rods is automatically centered due to the inherent resilience of the rods. The rods 14 are preferably equally circumferentially spaced about and connected between an upper guide ring 5 and a lower guide ring 6 closed by an integral plate portion 15 having an axially located upwardly directed spike 16.

The retaining device, generally referred to by the reference numeral 17, is centered relative to a body wall (unnumbered) of the container 1 by three equally circumferentially spaced radially outwardly directed telescopic arms 18 welded or otherwise conventionally secured to the guide ring 5. Each of the arms 18 consists of a sleeve or tube 19 and a stem or rod 20 which is telescopically received in and slidable relative to the sleeve 19. A generally inverted L-shaped angle plate 21 is secured to the rod 20 and bears against an upper rim (unnumbered) of the container 1. The arms 18 are secured in any one of a plurality of positions by radial adjusting screws 22, in a manner clearly illustrated in FIGURE 5 of the drawings for the purpose of leveling a tree whose bottom end portion is positioned in the retaining device 17.

While several embodiments of the invention have been disclosed herein for purposes of a clear disclosure, it is within the scope of this invention that various changes, modifications and arrangements of parts may be made in comparable structures without departing from the inventive scope of this disclosure as defined by the appended claims.

What is claimed is:

1. A tree stand comprising a container having a body wall including a bottom wall, and a retaining device removably received in said container, said retaining device comprising at least one ring including means thereon for clampingly engaging a tree trunk and retaining the trunk in the ring, said retaining device including a plurality of resilient spring rods circumferentially spaced about said ring and integrally connected at one end to said ring, said rods having a portion extending radially outwardly from said ring and continuing downwardly toward the container bottom wall in spring-biased engagement with the inner surface of said container wall and automatically centering said ring within said container.

2. A tree stand comprising a cylindrical container having an inner cylindrical body wall surface, a retaining device in the container, said retaining device consisting solely of upper and lower rings adapted to receive therein an end portion of a tree and a plurality of one-piece connecting rods, said rings being in axial alignment, each of said rods being secured to at least one of said rings, said rods being constructed from resilient material for yielding movement in directions generally normal to the ring axes, each rod having radially and axially disposed portions, and said axially disposed portions being in yieldable bearing engagement with said cylindrical surface under the influence of the resilient material thereof.

3. A tree stand comprising a container having a body wall, a retaining device in the container, said retaining device comprising a pair of axially spaced and aligned rings adapted to receive therein an end portion of a tree, a plurality of one-piece connecting rods received between said rings, each of said rods being constructed from resilient material for yielding movement in directions generally normal to the ring axes, each of said rods including a pair of radially disposed portions secured to an associated one of each of said rings and axially disposed portions between the pairs of radially disposed portions, and at least one radially disposed portion of each rod including at least one undulation between one of said rings and associated axially disposed portion whereby the axially disposed portions are maintained in yielding bearing engagement with the body wall under the influence of the resilient material and the undulations.

4. The tree stand as defined in claim 3 wherein the portion of each rod secured to one of said rings is in parallel relationship to the axially disposed portions of the rods.

5. A tree stand comprising a container having a body wall and a bottom wall, said bottom wall having an axially upwardly directed peripheral wall, upper and lower axially spaced and aligned rings adapted to receive therein an end portion of a tree, said peripheral wall and lower ring being in telescopic concentric relationship, a plurality of one-piece connecting rods secured between said upper and lower rings, each of said rods being constructed from resilient material for yielding movement in directions generally normal to the ring axes, each of said rods including a pair of radially disposed portions secured to an associated one of each of said rings and axially disposed portions between the pairs of radially disposed portions, and at least one radially disposed portion of each rod including at least one undulation between one of said upper and lower rings and an associated axially disposed portion whereby the axially disposed portions are maintained in yielding bearing engagement with the body wall under the influence of the resilient material and the undulations.

6. A tree stand comprising a cylindrical container having an inner cylindrical body wall surface, a retaining device in the container, said retaining device having upper and lower rings adapted to receive therein an end portion of a tree and a plurality of one-piece connecting rods, said rings being in axial alignment, each of said rods being secured to said rings, said rods being constructed from resilient material for yielding movement in directions generally normal to the ring axes, each rod being generally arcuate in configuration, and a medial portion of each rod being in yieldable bearing engagement with said cylindrical surface under the influence of the resilient material thereof and the arcuate configuration of the rods.

7. A tree stand comprising a cylindrical container having an inner cylindrical body wall surface, a retaining device in the container, said retaining device having an upper ring adapted to receive therein an end portion of a tree and a plurality of one-piece centering rods, each of said rods being secured to said ring, said rods being constructed from resilient material for yielding movement in directions generally normal to the ring axes, each rod having a free terminal axially disposed portion, and the axially disposed portions being in yieldable bearing engagement with said cylindrical surface under the influence of the resilient material thereof.

8. The tree stand as defined in claim 6 wherein said medial portions are provided with padding.

9. The tree stand as defined in claim 7 wherein the terminal portions are provided with padding.

References Cited by the Examiner

UNITED STATES PATENTS

| 2,630,994 | 3/1953 | Dicoskey | 248—44 |
| 3,052,437 | 9/1962 | Schoen | 248—44 |

FOREIGN PATENTS

| 708,483 | 5/1931 | France. |
| 206,207 | 1/1940 | Switzerland. |

CLAUDE A. LE ROY, *Primary Examiner.*

FRANK L. ABBOTT, *Examiner.*

R. P. SEITTER, *Assistant Examiner.*